US011767810B2

(12) United States Patent
Cho et al.

(10) Patent No.: US 11,767,810 B2
(45) Date of Patent: Sep. 26, 2023

(54) TRIGENERATION SYSTEM USING DME

(71) Applicant: BIO FRIENDS INC., Daejeon (KR)

(72) Inventors: Wonjun Cho, Gyeonggi-do (KR); Hyejin Yu, Daejeon (KR); Youngsoo Lee, Daejeon (KR); Jeseol Lee, Daejeon (KR); Wonjae Cho, Seoul (KR); Myungkyu Jin, Seoul (KR); Junwoo Lee, Daejeon (KR)

(73) Assignee: BIO FRIENDS INC., Daejeon (KR)

( * ) Notice: Subject to any disclaimer, the term of this patent is extended or adjusted under 35 U.S.C. 154(b) by 40 days.

(21) Appl. No.: 17/631,904

(22) PCT Filed: Aug. 29, 2019

(86) PCT No.: PCT/KR2019/011067
§ 371 (c)(1),
(2) Date: Feb. 1, 2022

(87) PCT Pub. No.: WO2021/025223
PCT Pub. Date: Feb. 11, 2021

(65) Prior Publication Data
US 2022/0290636 A1  Sep. 15, 2022

(30) Foreign Application Priority Data

Aug. 5, 2019 (KR) .......................... 10-2019-0095012

(51) Int. Cl.
*F02M 21/02* (2006.01)
*F02M 31/20* (2006.01)
(Continued)

(52) U.S. Cl.
CPC ......... *F02M 21/0206* (2013.01); *F01N 3/101* (2013.01); *F01N 5/02* (2013.01);
(Continued)

(58) Field of Classification Search
CPC .......... F01N 3/00; F01N 3/101; F01N 3/0205; F01N 5/02; F01N 11/00; F01N 2560/025;
(Continued)

(56) References Cited

U.S. PATENT DOCUMENTS 4,033,135 A * 7/1977 Mandrin ................. F01K 23/02
60/648
7,235,322 B2 * 6/2007 Akikusa .................. B60L 50/61
123/3
(Continued)

FOREIGN PATENT DOCUMENTS

JP      2008-206475 A    9/2008
JP      6366456 B2       5/2016
(Continued)

OTHER PUBLICATIONS

Machine Translation KR 10-1784896 (Year: 2023).*
(Continued)

*Primary Examiner* — Audrey B. Walter
*Assistant Examiner* — Dapinder Singh
(74) *Attorney, Agent, or Firm* — CHRISTENSEN, FONDER, DARDI & HERBERT PLLC; Diane E. Bennett; Peter S. Dardi

(57) ABSTRACT

The purpose of the present invention is to provide a trigeneration system using dimethyl ether (DME), wherein the system produces electricity, controls heating and cooling, and supplies carbon dioxide as a fertilizer by driving a DME engine by using, as a raw material, DME which is clean fuel. A trigeneration system using DME according to the present invention may comprise: a DME tank in which DME fuel is stored; a DME engine driven by means of the DME fuel as a raw material; a DME fuel supply unit for supplying the DME fuel stored in the DME tank to the DME engine; a treatment unit connected to an exhaust line for discharging
(Continued)

exhaust gas from the DME engine, so as to treat harmful components of the exhaust gas; a power generation unit for producing electricity by means of a driving force of the DME engine; and a cooling and heating unit for supplying or collecting heat by means of the driving force of the DME engine.

7 Claims, 3 Drawing Sheets

(51) Int. Cl.
*F01N 5/02* (2006.01)
*F01N 3/10* (2006.01)
*F02B 63/04* (2006.01)
*F02B 63/06* (2006.01)
*F02B 65/00* (2006.01)
*F02D 41/00* (2006.01)
*F02D 41/14* (2006.01)

(52) U.S. Cl.
CPC .............. *F02B 63/04* (2013.01); *F02B 63/06* (2013.01); *F02B 65/00* (2013.01); *F02D 41/0027* (2013.01); *F02D 41/1441* (2013.01); *F02D 41/1454* (2013.01); *F02M 21/0227* (2013.01); *F02M 21/0242* (2013.01); *F02M 21/0245* (2013.01); *F02M 31/20* (2013.01)

(58) Field of Classification Search
CPC ......... F01N 2560/06; F01N 2900/1602; F01N 2900/1404; F01N 2900/1811; F01N 2570/16; F02B 63/04; F02B 63/06; F02B 43/10; F02B 43/00; F02B 65/00; F02B 2043/103; F02G 5/02; F02G 5/04; F02G 5/00; F02G 1/043; F02G 2260/00; F02G 2254/15; F02G 2262/00; F02D 41/0027; F02D 41/1441; F02D 41/1452; F02D 41/1454; F02D 41/0025; F02D 41/0235; F02D 19/0647; F02D 2200/0814; F02M 21/0206; F02M 21/0212; F02M 21/0227; F02M 21/0239; F02M 21/0242; F02M 21/0245; F02M 21/0248; F02M 31/20; Y02A 50/20; Y02T 10/12; Y02T 10/40

See application file for complete search history.

(56) References Cited

U.S. PATENT DOCUMENTS

2017/0198633 A1* 7/2017 Hackett .................. F02D 41/22
2017/0241350 A1* 8/2017 Ebbehoj ................ F02D 19/022

FOREIGN PATENT DOCUMENTS

| KR | 10-2010-0117766 A | 11/2010 |
| KR | 10-2017-0019105 A | 2/2017 |
| KR | 10-1784896 B1 | 10/2017 |
| KR | 10-1915455 B1 | 11/2018 |

OTHER PUBLICATIONS

Machine Translation KR 10-1915455 (Year: 2023).*
Machine Translation KR 10-2010-0117766 (Year: 2023).*
Machine Translation JP 6366456 (Year: 2023).*
Office Action from corresponding Korean Patent Application No. 10-2019-0095012 dated Sep. 20, 2019.
International Search Report for Patent Application No. PCT/KR2019/011067 dated May 4, 2020.

* cited by examiner

TRIGENERATION SYSTEM USING DME

TECHNICAL FIELD

This application is a National Stage filing of PCT Application No. PCT/KR2019/011067 filed Aug. 29, 2019, entitled "Trigeneration System Using DME" which claims the benefit of priority based on Korean Patent Application No. 10-2019-0095012 filed on Aug. 5, 2019,
which is incorporated herein in its entity by reference.

The present disclosure relates to a trigeneration system using dimethyl ether (DME) that generates electricity, controls air conditioning, and fertilizes carbon dioxide by driving a DME engine using dimethyl ether, a clean fuel, as a raw material.

BACKGROUND ART

The development of environment-friendly energy sources is now a global trend, and many countries have established mid- to long-term plans for the development of new energy technologies. Specifically, it focuses on the development of environment-friendly systems such as new energy technology development system technology improvement, emission gas control technology improvement, and clean energy conversion.

Among them, the technology that converts natural gas, which is clean energy, into another energy source is highly evaluated for the development of new fuel energy in the 21$^{st}$ century. One of them is dimethyl ether (DME) prepared from various raw materials (e.g., natural gas, landfill gas, biogas, biomass, coal, etc.).

DME prepared from various raw materials has recently been in the spotlight as transportation energy (fuel), which is attracting attention as an important next-generation fuel because it has characteristics that can compensate for most of the physical and chemical disadvantages of natural gas as a fuel.

In particular, from the perspective of transportation fuel, the use of DME has significantly lower emissions of nitrogen oxides and unreacted hydrocarbons than conventional gasoline and diesel fuels. Thus DME is being mentioned as one of the clean energy sources because it can satisfy the environmental regulations of the new Ultra Low Emission Vehicle (ULEV).

Therefore, a system that can effectively utilize DME fuel is required.

DISCLOSURE

Technical Problem

The present disclosure aims to provide a trigeneration system using DME that generates electricity, controls air conditioning, and fertilizes carbon dioxide by driving a DME engine using dimethyl ether, which is a clean fuel, as a raw material.

The technical problems to be achieved by the present disclosure are not limited to the technical problems mentioned above. Other technical problems not mentioned could be clearly understood by those of ordinary skill in the art to which the present disclosure belongs from the description below.

Technical Solution

The trigeneration system using DME according to the present disclosure may include a DME tank in which a DME fuel is stored; a DME engine driven by the DME fuel as a raw material; a DME fuel supply unit for supplying the DME fuel stored in the DME tank to the DME engine; a treatment unit connected to an exhaust line for discharging exhaust gas of the DME engine and treating harmful components of the exhaust gas; a power generation unit for generating electricity with a driving force of the DME engine; and a heating/cooling unit for supplying or recovering heat by the driving force of the DME engine.

Advantageous Effects

According to the present disclosure, using the trigeneration system increases the concentration of carbon dioxide in a demand facility to increase a photosynthesis rate. The growth and yield of fruits and vegetables are multiplied. Further, it increases heating and cooling energy efficiency, thereby reducing fuel costs. In addition, it reduces the cost of carbonation fertilization. Ultimately, these can lead to increased revenue.

According to the present disclosure, the trigeneration system uses DME, a clean fuel, as a fuel, thereby reducing the burden on the environment and supplying a plurality of resources such as electricity, heat, and fertilizer to the demand facility, thereby increasing the profit of the demand facility.

BEST MODE

Figure 1:
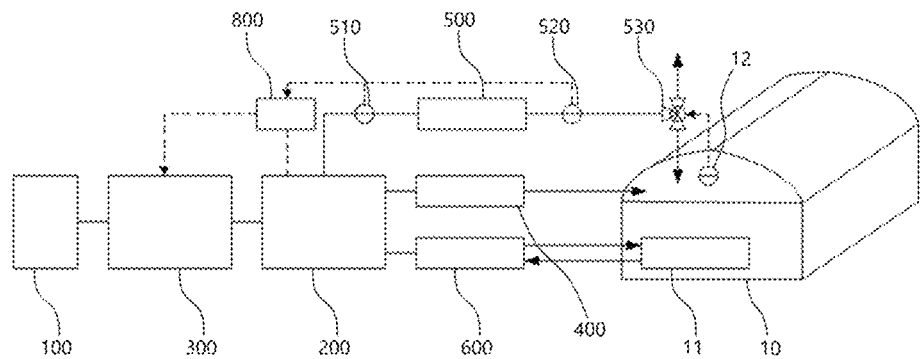
FIG. 1 is a block diagram showing a trigeneration system of the present disclosure.

A trigeneration system according to the present disclosure may include a DME tank in which a DME fuel is stored; a DME engine driven by the DME fuel as a raw material; a DME fuel supply unit for supplying the DME fuel stored in the DME tank to the DME engine; a treatment unit connected to an exhaust line for discharging exhaust gas of the DME engine and treating harmful components of the exhaust gas; a power generation unit for generating electricity with a driving force of the DME engine; and a heating/cooling unit for supplying or recovering heat by the driving force of the DME engine.

The DME fuel of the trigeneration system of the present disclosure may be supplied to the DME engine from the DME tank in a liquid state.

The trigeneration system of the present disclosure further includes a fuel injection unit receiving the DME fuel through the DME fuel supply unit and injecting the DME fuel to the DME engine. The DME fuel supply unit may include a fuel injection line for supplying the DME fuel of the DME tank to the fuel injection unit, and a fuel recovery line for recovering the DME fuel from the fuel injection unit to the DME tank.

The fuel injection line of the trigeneration system of the present disclosure may include an electromagnetic valve provided on the side of an outlet through which the DME fuel is discharged from the DME tank; a filter connected to the downstream of the electromagnetic valve and removing foreign substances from the DME fuel; a fuel supply pump connected to the downstream of the filter and injecting the DME fuel into the fuel injection unit; and a check valve connected to the downstream of the fuel supply pump and for preventing a reverse flow of the DME fuel.

The fuel recovery line of the trigeneration system of the present disclosure may include a regulator that recovers the DME fuel to adjust the pressure in order to prevent overpressure of the fuel injection unit, a check valve connected to the downstream of the regulator for allowing the DME fuel to flow only from the fuel injection unit to the DME tank, an electromagnetic valve connected to the downstream of the check valve for determining whether to open or close the fuel recovery line, and a cooling fan for cooling the DME fuel flowing through the fuel recovery line.

The trigeneration system of the present disclosure may further include a control unit for controlling the DME engine. A first oxygen sensor is provided at the front end of the treatment unit. A second oxygen sensor is provided at the rear end of the treatment unit. The control unit controls the air-fuel ratio of the DME engine based on the measured value of the first oxygen sensor. The operation state of the treatment unit may be monitored based on the measured value of the second oxygen sensor.

The treatment unit of the trigeneration system of the present disclosure is to generate carbon dioxide by treating the exhaust gas using a three-way catalyst. The treatment unit may further include a carbon dioxide supply unit for supplying carbon dioxide generated from the treatment unit to a demand facility.

The carbon dioxide supply unit of the trigeneration system of the present disclosure may supply the carbon dioxide to the demand facility when the concentration of carbon dioxide in the demand facility is below a set concentration. The carbon dioxide supply unit of the trigeneration system of the present disclosure may release the carbon dioxide to the atmosphere when the concentration of carbon dioxide in the demand facility exceeds a set concentration.

The carbon dioxide supply unit of the trigeneration system of the present disclosure may supply the carbon dioxide generated in the treatment unit to the demand facility at a certain time.

The carbon dioxide supply unit of the trigeneration system of the present disclosure may supply the carbon dioxide generated in the treatment unit to the demand facility based on a measured value of the carbon dioxide concentration of the carbon dioxide sensor provided in the demand facility.

The heating/cooling unit of the trigeneration system of the present disclosure may include a compressor driven by the driving force of the DME engine. When the temperature of the demand facility is higher than the set temperature, the compressor may receive a refrigerant gas from the demand facility and liquefies it to supply a refrigerant liquid to the demand facility. When the temperature of the demand facility is less than a set temperature, the compressor may receive a refrigerant liquid from the demand facility and vaporize it to supply a refrigerant gas to the demand facility.

Mode for Invention

Hereinafter, an embodiment according to the present disclosure will be described in detail with reference to the accompanying drawings. The size or shape of the components shown in the drawings may be exaggerated for clarity and convenience of explanation. In addition, terms specifically defined in consideration of the configuration and operation of the present disclosure may vary depending on the intention or custom of the user or operator. Definitions of these terms should be made based on the content throughout this specification.

Figure 2:
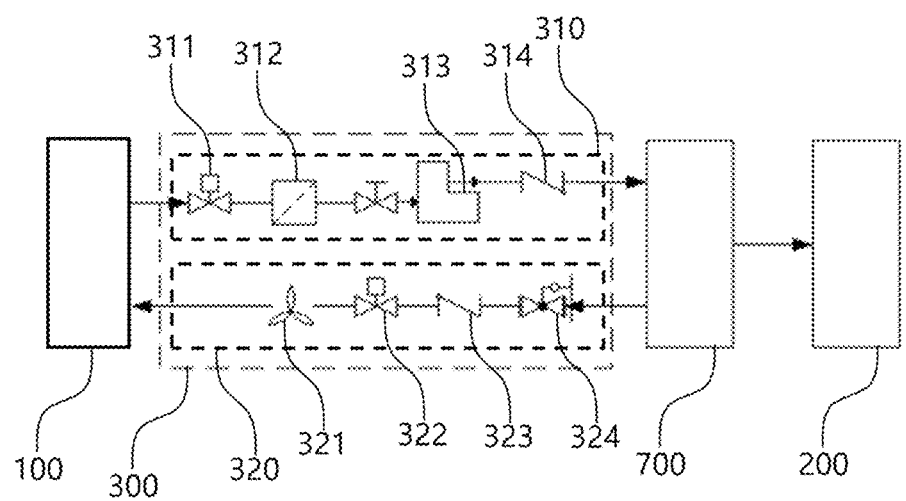
FIG. 2 is a block diagram showing a DME fuel supply unit.
Figure 3A:
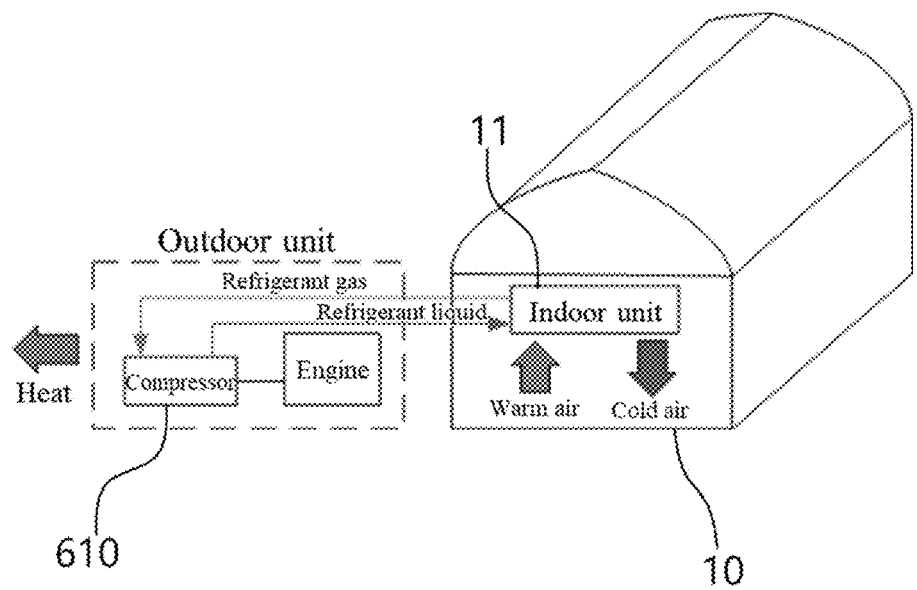
FIG. 3A is a conceptual diagram illustrating a state in which a heating/cooling unit recovers heat to a demand facility.
Figure 3B:
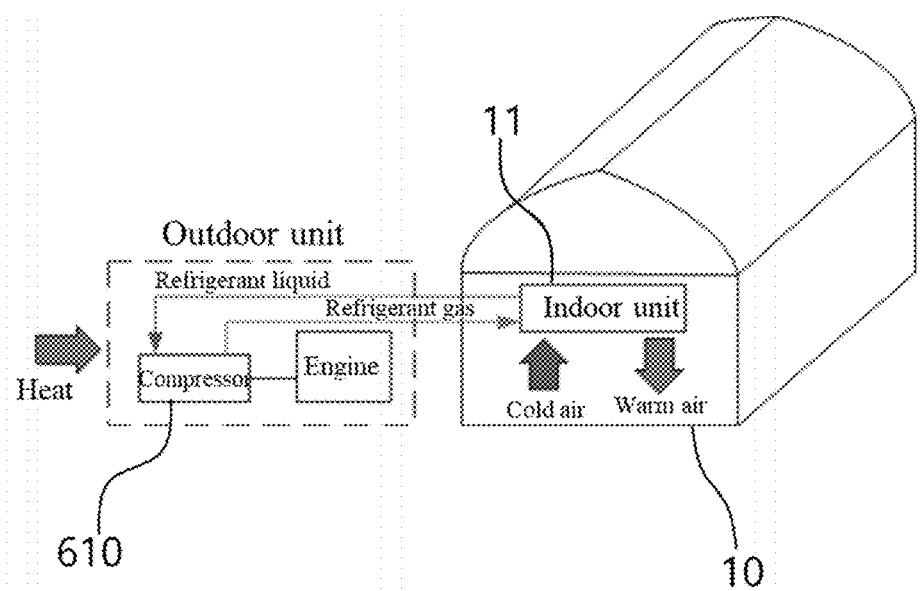
FIG. 3B is a conceptual diagram illustrating a state in which a heating/cooling unit supplies heat to a demand facility.
Figure 4:
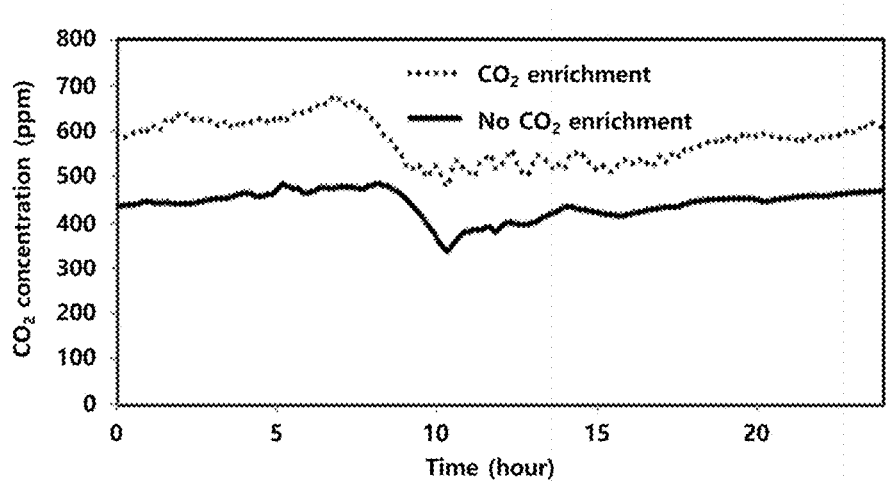
FIG. 4 is a graph showing a change in the concentration of carbon dioxide in a demand facility according to the supply of carbon dioxide.
Figure 5:
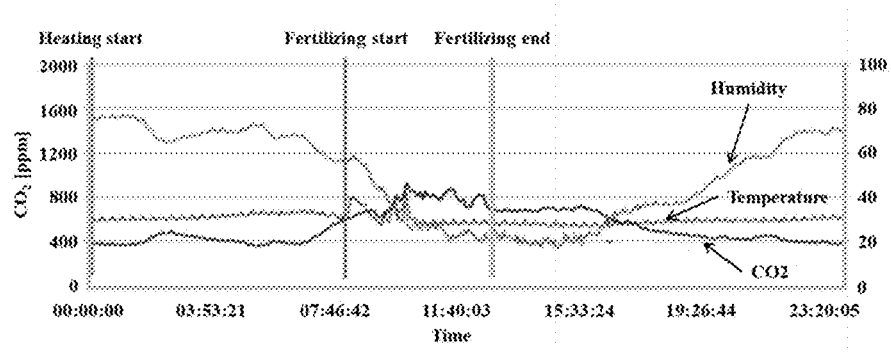
FIG. 5 is a graph showing changes in humidity, temperature, and carbon dioxide concentration of a demand facility to which a trigeneration system of the present disclosure is applied.
Figure 6:
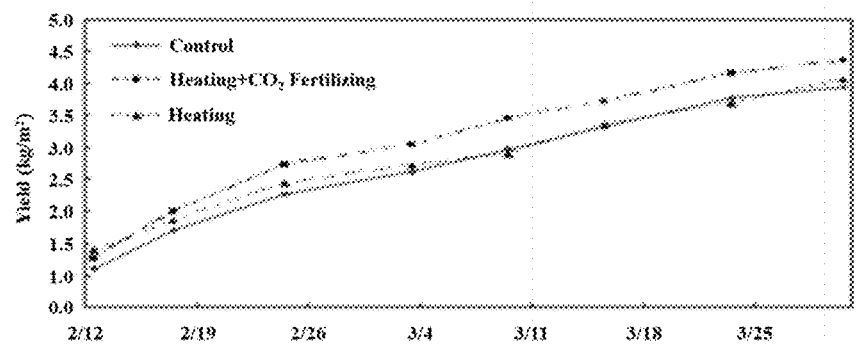
FIG. 6 is a graph showing the effect of heating and carbon dioxide supply using a trigeneration system of the present disclosure on the yield of fruits and vegetables in a demand facility.

FIG. 1 is a block diagram showing a trigeneration system of the present disclosure. FIG. 2 is a block diagram showing a DME fuel supply unit (300). FIG. 3A is a conceptual diagram illustrating a state in which a heating/cooling unit (600) recovers heat to a demand facility (10). FIG. 3B is a conceptual diagram illustrating a state in which a heating/cooling unit (600) supplies heat to a demand facility (10). FIG. 4 is a graph showing a change in the concentration of carbon dioxide in a demand facility (10) according to the supply of carbon dioxide. FIG. 5 is a graph showing changes in resources such as humidity, temperature, and carbon dioxide concentration of a demand facility (10) to which a trigeneration system of the present disclosure is applied. FIG. 6 is a graph showing the effect of heating and carbon dioxide supply using a trigeneration system of the present disclosure on the yield of fruits and vegetables in a demand facility (10).

Hereinafter, with reference to FIGS. 1 to 6, the configuration and function of the trigeneration system of the present disclosure will be described in detail.

The present disclosure may be a trigeneration system for generating electricity, controlling air conditioning, and fertilizing carbon dioxide by driving a DME engine (200) using dimethyl ether, which is a clean fuel, as a raw material. More specifically, electric energy may be supplied to the demand facility (10) for cultivating fruits and vegetables, such as a greenhouse. In addition, it is possible to control the temperature of the demand facility (10) by supplying or recovering thermal energy, and to fertilize fertilizers such as carbon dioxide.

As shown in FIG. 1, the trigeneration system according to the present disclosure may include a DME tank (100) in which a DME fuel is stored; a DME engine (200) driven by the DME fuel as a raw material; a DME fuel supply unit (300) for supplying the DME fuel stored in the DME tank (100) to the DME engine (200); a treatment unit (500) connected to an exhaust line for discharging exhaust gas of the DME engine (200) and treating harmful components of the exhaust gas; a power generation unit (400) for generating electricity with a driving force of the DME engine (200); and a heating/cooling unit (600) for supplying or recovering heat by the driving force of the DME engine (200).

The DME tank (100) may store the DME fuel in a liquid state. Specifically, the DME fuel may be supplied from the DME tank (100) to the DME engine (200) in a liquid state. The DME tank (100) may be provided with a means for maintaining and controlling the pressure and temperature so that the DME can maintain a liquid state.

The trigeneration system of the present disclosure may further include a fuel injection unit (700) that receives the DME fuel from the DME fuel supply unit (300) and injects the DME fuel into the DME engine (200). The fuel injection unit (700) may atomize the liquid DME fuel so that the DME fuel can be well combusted inside the DME engine (200) and inject it into the DME engine (200).

The DME engine (200) may be a device that burns DME fuel to generate mechanical energy, thermal energy, and the like.

The power generation unit (400) may be a facility or device that receives the driving force output from the DME engine (200) and produces electric energy.

As shown in FIG. 2, the DME fuel supply unit (300) may include a fuel injection line (310) for supplying the DME fuel of the DME tank (100) to the fuel injection unit (700), and a fuel recovery line (320) for recovering the DME fuel from the fuel injection unit (700) to the DME tank (100).

Since the fuel injection line (310) and the fuel recovery line (320) are provided together in the DME fuel supply unit (300), it is possible to prevent excessive increase in the pressure of the pipe or waste of the DME fuel.

The fuel injection line (310) may include an electromagnetic valve (311) provided on the side of an outlet through which the DME fuel is discharged from the DME tank (100); a filter (312) connected to the downstream of the electromagnetic valve (311) and removing foreign substances from the DME fuel; a fuel supply pump (313) connected to the downstream of the filter (312) and injecting the DME fuel into the fuel injection unit (700); and a check valve (314) connected to the downstream of the fuel supply pump (313) and for preventing a reverse flow of the DME fuel. That is, the configurations of the fuel injection line (310) may be connected with the DME tank (100) and the fuel injection unit (700) in the order of [DME tank (100)]-[electromagnetic valve (311)]-[filter (312)]-[fuel supply pump (313)]-[check valve (314)]-[fuel injection unit (700)]. The DME fuel in the fuel injection line (310) may flow in the order of [DME tank (100)]-[electromagnetic valve (311)]-[filter (312)]-[fuel supply pump (313)]-[check valve (314)]-[fuel injection unit (700)].

The fuel recovery line (320) may include a regulator (324) that recovers the DME fuel to adjust the pressure in order to prevent overpressure of the fuel injection unit (700), a check valve (323) connected to the downstream of the regulator (324) for allowing the DME fuel to flow only from the fuel injection unit (700) to the DME tank (100), an electromagnetic valve (322) connected to the downstream of the check valve (323) for determining whether to open or close the fuel recovery line (320), and a cooling fan (321) for cooling the DME fuel flowing through the fuel recovery line (320). That is, the components of the fuel recovery line (320) may be connected with the DME tank (100) and the fuel injection unit (700) in the order of [DME tank (100)]-[cooling fan (321)]-[electromagnetic valve (322)]-[check valve (323)]-[regulator (324)]-[fuel injection unit (700)].

In the fuel recovery line (320), the DME fuel may flow in the order of [fuel injection unit (700)]-[regulator (324)]-[check valve (323)]-[electromagnetic valve (322)]-[cooling fan (321)]-[DME tank (100)]. Since the cooling fan (321) and the regulator (324) are provided in the fuel recovery line (320), the DME fuel can be processed in the DME tank (100) at a temperature and pressure favorable for storage.

The fuel recovery line (320) may prevent overpressure from being formed in the fuel injection unit (700). If overpressure is formed in the fuel injection unit (700), problems in stability and other problems in DME fuel injection control may occur. The pressure of the fuel injection unit (700) may be a variable that affects the injection amount of the DME fuel injected to the DME engine (200). For example, when the injection amount of the DME fuel injected into the DME engine (200) needs to be reduced, if only the fuel injection line (310) exists without the fuel recovery line (320), it may be difficult to control the injection amount of the DME fuel.

In addition, when an overpressure is formed in the fuel injection unit (700) due to the DME fuel, engine oil may leak into the fuel injection unit (700). If the engine oil leaks, there may be a problem in lubrication of the fuel injection unit (700) and damage to the fuel injection unit (700) may occur. In order to prevent this, when an overpressure is formed, some of the DME fuel may be recovered to the fuel recovery line (320).

As described above, the fuel injection line (310) recovers the DME fuel from the fuel injection unit (700) again, and may help prevent a safety accident and control the DME fuel injection.

The electromagnetic valves (311) and (322) provided in the fuel injection line (310) and the fuel recovery line (320) may be solenoid valves.

The trigeneration system of the present disclosure may further include a control unit (800) for controlling the DME engine (200). The control unit (800) may be an engine control unit (ECU) that controls the DME fuel injected into the DME engine (200).

A first oxygen sensor (510) may be provided at a front end of the treatment unit (500), and a second oxygen sensor (520) may be provided at a rear end of the treatment unit (500).

The control unit (800) may control the air-fuel ratio of the DME engine (200) based on the measured value of the first oxygen sensor (510). Specifically, the control unit (800) may control the speed of the fuel supply pump (313) provided in the fuel injection line (310) based on the measured value of the first oxygen sensor (510).

The treatment unit (500) may reduce at least one of nitrogen oxides (NOx), carbon monoxide (CO), and total hydrocarbons (THC) included in the exhaust gas through a three-way catalyst. The state of the three-way catalyst of the treatment unit (500) may be monitored based on the measured value of the second oxygen sensor (520).

TABLE 1

| Measuring position | $NO_x$ (ppm) | CO (ppm) | THC (ppm) | $CO_2$ (%) |
| --- | --- | --- | --- | --- |
| Exhaust pipe center | 15 | 3 | 17 | 1.8 |
| Upper exhaust pipe | 6 | 1 | 5 | 0.8 |
| Lower exhaust pipe | 6 | 1 | 5 | 0.9 |
| Exhaust pipe left | 5 | 1 | 0 | 0.7 |
| Exhaust pipe right | 6 | 1 | 5 | 0.9 |

Table 1 shows the composition of exhaust gas discharged from the DME engine (200), and the values are measured at the center, upper, lower, left and right sides of the exhaust pipe connected to the rear end of the treatment unit (500). The reference value of harmful gas concentration in the exhaust gas was 30 ppm, and carbon monoxide in the exhaust gas that passed through the treatment unit (500) was 1 to 3 ppm, nitrogen oxide concentration was 5 to 15 ppm, and total hydrocarbons were 0 to 17 ppm. The concentration of $CO_2$ to be supplied to the greenhouse was 7,000 to 18,000 ppm, which is a sufficient amount. The carbon monoxide concentration is controlled according to the engine speed and load. When the engine speed and load are low, the carbon monoxide concentration is low. When the engine speed and load are high, the carbon monoxide concentration is high, but it is maintained below the reference value by the three-way catalyst.

That is, the treatment unit (500) may treat the exhaust gas using a three-way catalyst to generate carbon dioxide. The trigeneration system of the present disclosure may further include a carbon dioxide supply unit (not shown) for supplying the carbon dioxide generated from the treatment unit (500) to the demand facility (10).

The carbon dioxide supply unit may supply the carbon dioxide generated in the treatment unit (500) to the demand facility (10) when the measured value of the carbon dioxide sensor (12) provided in the demand facility (10) for cultivating fruits and vegetables is below a set concentration. When the measured value of the carbon dioxide sensor (12) exceeds a set concentration, the unit may release the carbon dioxide generated in the treatment unit (500) to the atmosphere. That is, the trigeneration system of the present disclosure can be used as a fertilizer by supplying carbon dioxide generated during the treatment of exhaust gas emitted from DME combustion to a fruit and vegetable cultivation facility. Specifically, a three-way valve (530) may be provided at the output terminal for discharging carbon dioxide from the treatment unit (500), and connected to the atmosphere and the demand facility (10). The three-way valve (530) may be controlled based on the measured value of the carbon dioxide sensor (12) provided in the demand facility (10).

The carbon dioxide supply unit may supply the carbon dioxide generated in the treatment unit (500) to the demand facility (10) at a predetermined time. For example, in order to supply carbon dioxide when sufficient light is irradiated to crops, carbon dioxide may be supplied to the demand facility (10) at sunrise time, and the supply of carbon dioxide may be stopped at sunset time.

The carbon dioxide supply unit may supply the carbon dioxide generated in the treatment unit (500) to the demand facility (10) based on a measured value of an optical sensor provided in the demand facility (10). Specifically, when the illuminance value is greater than or equal to a predetermined value, carbon dioxide may be supplied to the demand facility (10), and when the illuminance value is less than a predetermined value, the supply of carbon dioxide may be stopped.

As shown in FIGS. 3A and 3B, the cooling/heating unit (600) may include a compressor (610) driven by a driving force of the DME engine (200). The compressor (610) and the demand facility (10) may be connected to each other through a flow path for exchanging the refrigerant.

As shown in FIG. 3A, when the temperature of the demand facility (10) is higher than a set temperature, the compressor (610) may receive a refrigerant gas from the demand facility (10) and liquefy it to supply a refrigerant liquid to the demand facility (10). That is, the compressor (610) may remove heat from the refrigerant and supply it to the demand facility (10).

As shown in FIG. 3B, when the temperature of the demand facility (10) is less than a set temperature, the compressor (610) may receive a refrigerant liquid from the demand facility (10) and gasify it to supply a refrigerant gas to the demand facility (10). That is, the compressor (610) may supply heat to the refrigerant and supply it to the demand facility (10).

FIG. 4 is a graph showing a change in the concentration of carbon dioxide in a demand facility (10) according to the supply of carbon dioxide. FIG. 5 is a graph showing changes in resources during one day of a demand facility (10) to which a trigeneration system of the present disclosure is applied, such as humidity, temperature, and carbon dioxide concentration according to time. It can be seen that the concentration of carbon dioxide is maintained above a certain level even during the day when photosynthesis is actively taking place due to the supply of carbon dioxide.

TABLE 2

| Applicability of the inventive system | Plant height (cm) | Leaf area ($cm^2$) | Leaf dry weight (g) |
|---|---|---|---|
| X | 96.0 ± 4.5 | 4945.3 ± 247.0 | 40.7 ± 2.8 |
| ○ | 118.5 ± 8.8 | 5466.6 ± 127.2 | 44.5 ± 1.2 |

Table 2 shows the growth status of crops in the demand facility (10) to which the trigeneration system of the present disclosure is applied and the demand facility (10) to which it is not. FIG. 6 is a graph showing the effect of heating and carbon dioxide supply using a trigeneration system of the present disclosure on the yield of fruits and vegetables in the demand facility (10), specifically, the yield of paprika. Comparing the fruits and vegetables using the trigeneration system of the present invention and the control group not using the system, it can be seen that the yield is increased by about 11%. That is, according to the present disclosure, using the trigeneration system increases the concentration of carbon dioxide in the demand facility (10) to increase a photosynthesis rate. The growth and yield of fruits and vegetables are multiplied. Further, it increases heating and cooling energy efficiency, thereby reducing fuel costs. In addition, it reduces the cost of carbonation fertilization. Ultimately, these can lead to increased revenue.

Although the embodiments according to the present disclosure have been described above, these are merely exemplary, and those of ordinary skill in the art will understand that various modifications and equivalent ranges of embodiments are possible therefrom. Accordingly, the true technical protection scope of the present disclosure should be defined by the following claims.

INDUSTRIAL AVAILABILITY

According to the present disclosure, using the trigeneration system increases the concentration of carbon dioxide in a demand facility to increase a photosynthesis rate. The growth and yield of fruits and vegetables are multiplied. Further, it increases heating and cooling energy efficiency, thereby reducing fuel costs. In addition, it reduces the cost of carbonation fertilization. Ultimately, these can lead to increased revenue.

According to the present disclosure, the trigeneration system uses DME, a clean fuel, as a fuel, thereby reducing the burden on the environment and supplying a plurality of resources such as electricity, heat, and fertilizer to the demanding facilities, thereby increasing the profit of the demanding facilities.

The invention claimed is:
1. A trigeneration system using dimethyl ether (DME) comprising: a DME tank in which a DME fuel is stored; a DME engine driven by the DME fuel; a DME fuel supply unit for supplying the DME fuel stored in the DME tank to the DME engine; a treatment unit connected to an exhaust line for discharging exhaust gas of the DME engine and treating harmful components of the exhaust gas; a power generation unit for generating electricity with a driving force of the DME engine; and a heating/cooling unit for supplying or recovering heat by the driving force of the DME engine, wherein the DME fuel is supplied to the DME engine from the DME tank in a liquid state, which further comprises a fuel injection unit receiving the DME fuel through the DME fuel supply unit and injecting the DME fuel to the DME engine, wherein the DME fuel supply unit comprises a fuel injection line for supplying the DME fuel of the DME tank to the fuel injection unit, and a fuel recovery line for recovering the DME fuel from the fuel injection unit to the DME tank, wherein the fuel injection line comprises an electromagnetic valve provided on the side of an outlet through which the DME fuel is discharged from the DME tank; a filter connected downstream of the electromagnetic valve and removing foreign substances from the DME fuel; a fuel supply pump connected to the downstream of the filter and injecting the DME fuel into the fuel injection unit and a check valve connected to the downstream of the fuel supply pump and for preventing a reverse flow of the DME fuel, wherein the fuel recovery line comprises a regulator that recovers the DME fuel to adjust the pressure in order to prevent overpressure of the fuel injection unit a check valve connected to the downstream of the regulator for allowing the DME fuel to flow only from the fuel injection unit to the DME tank; an electromagnetic valve connected to the downstream of the check valve for determining whether to open or close the fuel recovery line; and a cooling fan for cooling the DME fuel flowing through the fuel recovery line, wherein the treatment unit generates carbon dioxide by treating the exhaust gas using a three-way catalyst, and further comprises a carbon dioxide supply unit for supplying carbon dioxide generated from the treatment unit to a demand facility, wherein the carbon dioxide supply unit supplies the carbon dioxide generated in the treatment unit to the demand facility at a certain time.

2. The trigeneration system of claim 1, wherein the trigeneration system further comprises a control unit for controlling the DME engine, and a first oxygen sensor is provided at the front end of the treatment unit, and a second oxygen sensor is provided at the rear end of the treatment unit, wherein the control unit controls an air-fuel ratio of the DME engine based on a measured value of the first oxygen sensor, and the operation state of the treatment unit is monitored based on a measured value of the second oxygen sensor.

3. The trigeneration system of claim 1, wherein the carbon dioxide supply unit supplies the carbon dioxide to the demand facility when the concentration of carbon dioxide in the demand facility is below a set concentration, and releases the carbon dioxide to the atmosphere when the concentration of carbon dioxide in the demand facility exceeds a set concentration.

4. The trigeneration system of claim 1, wherein the carbon dioxide supply unit supplies the carbon dioxide generated in the treatment unit to the demand facility based on a measured value of the carbon dioxide concentration of a carbon dioxide sensor provided in the demand facility.

5. The trigeneration system of claim 1, wherein the heating/cooling unit comprises a compressor driven by a driving force of the DME engine, wherein the compressor receives and liquefies a refrigerant gas from the demand facility to supply a refrigerant liquid to the demand facility, when the temperature of the demand facility is higher than a set temperature, and receives and vaporizes a refrigerant liquid from the demand facility to supply a refrigerant gas to the demand facility, when the temperature of the demand facility is less than a set temperature.

6. The trigeneration system of claim 1, wherein the carbon dioxide supply unit supplies the carbon dioxide generated in the treatment unit to the demand facility based on a measured value of the carbon dioxide concentration of a carbon dioxide sensor provided in the demand facility and a measured value of an optical sensor provided in the demand facility.

7. The trigeneration system of claim 1, wherein the certain time is from sunrise to sunset.

* * * * *